United States Patent [19]
Hale

[11] Patent Number: 5,341,882
[45] Date of Patent: Aug. 30, 1994

[54] WELL DRILLING CUTTINGS DISPOSAL

[75] Inventor: Arthur H. Hale, Houston, Tex.

[73] Assignee: Shell Oil Company, Houston, Tex.

[21] Appl. No.: 15,185

[22] Filed: Feb. 10, 1993

[51] Int. Cl.$^5$ .................. B09B 3/00; E21B 21/06; E21B 33/14

[52] U.S. Cl. .................... 166/293; 106/790; 166/292; 175/66; 405/128

[58] Field of Search ............... 166/292, 293; 405/128; 175/65, 66; 106/789, 790

[56] References Cited

U.S. PATENT DOCUMENTS

| | | | |
|---|---|---|---|
| 3,168,139 | 2/1965 | Kennedy et al. | |
| 3,499,491 | 3/1970 | Wyant et al. | 166/292 |
| 4,338,134 | 7/1982 | Graf zu Münster | 405/128 |
| 4,880,468 | 11/1989 | Bowlin et al. | |
| 4,942,929 | 7/1990 | Malachosky et al. | 175/66 |
| 5,058,679 | 10/1991 | Hale et al. | 166/293 |
| 5,213,160 | 5/1993 | Nahm et al. | 166/293 |
| 5,277,519 | 1/1994 | Nahm | 405/128 |

OTHER PUBLICATIONS

Cowen et al, SPE Paper 24575, Oct. 4, 1992.

*Primary Examiner*—George A. Suchfield

[57] ABSTRACT

Well cuttings are disposed of by solidification by combining the cuttings with water and blast furnace slag, and injection of the cuttings, water and slag into an annulus surrounding a wellbore casing and solidifying the cuttings, water and slag. Solidification in blast furnace slag cement is inexpensive, and the blast furnace slag is compatible with both oil and water based drilling muds. Drilling fluids therefore do not have to be removed from the drilling cuttings prior to solidification in the wellbore annulus.

16 Claims, No Drawings

WELL DRILLING CUTTINGS DISPOSAL

FIELD OF THE INVENTION

The present invention relates to a method of disposal of drilling cuttings and to a wellbore cement comprising these drilling cuttings.

BACKGROUND TO THE INVENTION

Minimizing the creation of solid wastes and economical disposal of solid wastes have become very important in drilling of oil and gas wells. Stiffer environmental regulation, "cradle to grave" liability for solid wastes, and increased landowner restrictions have contributed to considerable increases in the cost of disposal of solid wastes. Generally, solid wastes such as drilling cuttings have been disposed of by burial, solidification, landfarming, annular injection and commercial disposal. Each of these methods have drawbacks.

Commercial disposal of drilling waste is very expensive, and can be only a temporary disposition for solid wastes because the originator can be found liable for remediation of disposal sites at a later time.

Burial, solidification and landfarming typically require that drilling fluids be removed from the solids. Removal of drilling fluids from drilling cuttings is particularly important when an oil-based or emulsion drilling fluids are used due to the contamination by the oil-based materials. Removal of the drilling fluids in turn results in generation of other forms of wastes.

Solidification of wastes is disclosed in U.S. Pat. Nos. 4,880,468 and 4,338,134. Patent '468 discloses combining hygroscopic material and a cementitious binder to material with drilling wastes to solidify drilling wastes. The cementitious binder is a Portland cement. Patent '134 discloses fixation of wastes with hydraulic mortar to enable easier disposal of the wastes. Injection of drilling wastes into an injection well is disclosed in U.S. Pat. No. 4,942,929. Large drilling cuttings are recovered, washed and used as construction gravel and smaller solids are separated from drilling fluids and pumped into a formation through the injection well.

Solidification also typically requires removal of residual drilling fluids from drilling cuttings because drilling fluids and cements are usually incompatible. Even most water based drilling muds will either cause instant setting of the cement or act as a retarder of the cement setting. Strength of the set cement is also adversely affected by the presence of most drilling fluids.

Solidification of the drilling solids within cement can fix contaminates and greatly reduce the expense of disposal, but solidification within cements has not been widely practiced due to the expense of cementing materials and the expense of removing incompatible drilling fluids.

U.S. Pat. Nos. 3,168,139 and 3,499,491 disclose the conversion of drilling fluids to wellbore cement slurries. Conversion of drilling fluids to cement slurries eliminates the need to dispose of used muds and eliminates the need to provided some additives, such as fluid loss and free water control additives that are already present in the drilling fluids. U.S. Pat. No. 5,058,679 discloses a process to convert drilling fluids to a wellbore cement slurry by adding blast furnace slag to acceptable drilling fluids. The use of the blast furnace slag as a cement compound significantly reduces the cost of converting the drilling fluids to cement compared to the use of Portland cements as cement compound. The use of blast furnace slag instead of Portland cement also provides for a slurry that is very compatible with the original drilling fluid resulting in other significant advantages.

It is therefore an object of the present invention to provide a method to dispose of drilling cuttings by solidification wherein removal of drilling fluids from the drilling cuttings prior to solidification is not necessary. It is an additional object to provide a method to solidify drilling cuttings wherein the cementation compound is blast furnace slag.

SUMMARY OF THE INVENTION

These and other objects are accomplished by a method to solidify drilling cuttings contaminated with drilling fluid comprising the steps of: combining the drilling cuttings with blast furnace slag and water to form a slurry; injecting the slurry into an annulus surrounding a well casing; and allowing the slurry to harden to form a solidified wellbore cement. The cement slurry containing the drilling cuttings may be injected into a wellbore annulus to provide a useful wellbore cement. Removal of drilling fluids from the cuttings is not necessary with this method because the drilling fluids are compatible with the blast furnace slag cements.

When the borehole is drilled with a drilling fluid that contains blast furnace slag, as disclosed in U.S. patent application Ser. No. 691,905, now abandoned, excess drilling fluids are a preferred source of blast furnace slag for solidification of drilling cuttings. Further drilling fluids are "fixed" in the set cement and therefore do not contaminate the surrounding formation after the cement sets. Additionally, drilling mud is also a preferred source of water for the preparation of the slurry because the present invention then also reduces the need to dispose of drilling fluid, and useful additives such as viscosifiers and fluid loss additives are present in drilling fluids.

DETAILED DESCRIPTION OF THE INVENTION

Solidification of a slurry containing drilling cuttings is accomplished by the addition of blast furnace slag and optionally additives for the control of setting time and rheological properties of the slag-treated fluid. The term blast furnace slag refers to the refuse from the melting of metals or reduction of ores in a furnace. Blast furnace slag is a by-product of the manufacture of steel in a blast furnace. In steel making, the blast furnace slag is discharged from the furnace as a molten stream at temperatures typically between 1400° C. and 1600° C. Rapid quenching of the slag results in its conversion into a material which is hydraulic. Hydraulic is defined as capable of forming a cementitious solid when mixed with water. Rapid quenching of the slag converts it into a glassy state and it is generally recognized that the hydraulic quality of the slag depends upon the effectiveness of the process used to rapidly cool the slag and freeze it into the granulated, glassy state.

Components of blast furnace slag include silicon dioxides, aluminum oxides, iron oxides, calcium oxide, magnesium oxide, sodium oxide, potassium oxide and sulfur. The actual components present and the amounts of the components, varies because the optimum furnace operations varies with the metals or ores being processed. Hence, there is seldom any significant flexibility to adjust the chemical composition of the slag to improve hydraulicity.

Because the quenching process directly influences the hydraulicity of blast furnace slag, determination of hydraulic properties through chemical analysis has limited value. Two slags having the same general chemical composition can have significantly different hydraulicity due to the quenching process and its effectiveness. The glass content of the slags increases with the rate of cooling and water quenching produces a very high cooling rate. Air quenching often produces slags with various levels of glass content due to differences in cooling rates. Smaller particles have a higher glass content due to faster cooling while the larger particles cool more slowly and have a lower glass content. Therefore, the selection of a cementitious blast furnace slag for this invention is best determined by a direct performance (strength) test of the slag mixed with water to evaluate the slag's hydraulicity.

The preferred blast furnace slag of the invention is a high glass content slag produce by quickly quenching the molten slag through intimate contact with large volumes of cool water. Slags produced by air quenching may be used in the invention provided they are determined to have cementitious properties. However, they are less desirable. The fineness of the slag should be between about 2000 $cm^2/g$ and 20,000 $cm^2/g$ and more preferably between 3000 $cm^2/g$ and 9000 $cm^2/g$ and most preferably between 4000 $cm^2/g$ and 6500 $cm^2/g$. A commercially available blast furnace slag which fulfills the requirements of the invention is marketed under the trade name "NEWCEM" by the Blue Circle Atlantic Company. This slag is obtained from the Bethlehem Steel Corporation, Sparrows Point, Md.

Additives which may be used to control setting and hardening time include alkali metal oxides and hydroxides; alkali and transition metal carbonates, sulfate, nitrates and nitrites; and alkali metal halides. Examples of such compounds include sodium hydroxide, calcium oxide, calcium hydroxide, magnesium hydroxide, magnesium oxide, sodium carbonate, sodium sulfate, calcium sulfate, calcium nitrate, calcium nitrite, zinc oxide, zinc carbonate, titanium carbonate, potassium hydroxide, potassium sulfate, potassium nitrate, potassium nitrite, copper sulfate, sodium fluoride. These components are also referred to as activators.

Rheological properties of the blast furnace slag-containing slurries can be modified, if necessary, by conventional chemical dispersants for water-based drilling fluids. Examples of such compounds include: lignosulfonates, naphthalene sulfonates, phenol sulfonates, phosphates, sulfonated styrene maleic anhydride (SSMA), sulfonated toluene maleic anhydride (STMA), sulfonated styrene maleimide (SSMI), polyacrylates, polymethacrylates, blends of polyacrylates and polymethacrylates, acrylamide-acrylic acid copolymers, or blends of any of these classes of materials provided they are chemically compatible to allow their mixing while these classes of materials provided they are chemically compatible to allow their mixing while retaining the ability to disperse particles in the drilling fluid.

Salts may be present in the water used for preparation of the slurry of the present invention. Salts are preferably present if the slurry will be injected into an annulus around a casing wherein the formation ground around the wellbore contains clays. Salts may also be present in drilling fluids used to prepare the slurries of the present invention. An advantage of the use of blast furnace slag slurry as a wellbore cement is that salts do not adversely affect the cement, and can in fact improve set cement strength.

Water must be present in the slurry for combination with blast furnace slag for form the cementitious material. Water must be a continuous phase in the liquid phase of the waste stream although liquid hydrocarbon could be present. A sufficient amount of water must be in the slurry to form a strong solid mass upon hydrolysis of the blast furnace slag. This will typically be between about 99 percent and about 50 percent by weight based on the slurry.

The water used to prepare the slurry of the present invention is preferably a drilling fluid. The drilling fluid must generally be disposed of when the well is completed and solidification of drilling cuttings therefore serves as a disposition of both the cuttings and a portion of the drilling fluid. Additionally, the drilling fluid may contain additives such as viscosifiers and fluid loss additives. Viscosifiers are useful in maintaining the cuttings in suspension in the slurry until the slurry has set. Fluid loss additives reduce loss of liquid water from the slurry into the surrounding formation.

The water of the present invention is most preferably a drilling fluid that contains blast furnace slag. Blast furnace slag is useful in drilling fluids because it becomes part of a fluid loss barrier. Upon contact with activator, or after a sufficient time period, the fluid loss barrier hardens on the wall of the borehole. This eliminates the need to remove the fluid loss barrier prior to cementation of the annulus. The presence of blast furnace slag in the drilling fluid also can provide the blast furnace slag for the slurry of the present invention.

The drilling cuttings of the present invention may be cuttings circulated form the drill bit to the surface by drilling fluid and separated from the drilling fluid by known means such as a shaker table or by gravity settlement from the fluid in a mud pit or tank. The cuttings may be ground to a smaller average size by a means such as circulation through a centrificial pump. Reduction of the cuttings average particle size is preferred when the slurry containing the cuttings is to be injected into the wellbore annulus as a wellbore cement. Reduction of the average particle size increases the time the cuttings will remain in suspension in the slurry.

Removal of drilling fluids or washing of the drilling fluids from the cuttings is not necessary and is not preferred. The drilling fluids may be decanted from the cuttings to concentrate the cuttings to be disposed, but if disposal of decanted drilling fluid is desired, the excess drilling fluid can also be solidified by the process of the present invention. When the drilling fluids are decanted from the cuttings, the remaining cuttings may contain from about one to about twenty percent by weight of drilling fluids.

Solidification of the drilling cuttings according to the present invention is most advantageous when the wellbore is drilled using an oil-based or emulsion type drilling fluid. Disposal of drilling cuttings contaminated with these drilling fluids is generally more difficult.

Generally, between about 10 and about 40 percent by weight of the slurry may be drilling cuttings. The slurry further comprises about five to about fifty percent by weight of the cuttings of blast furnace slag. Less slag results in a hardened slurry having a low strength and more blast furnace slag increases the cost of the disposal of the cuttings unnecessarily.

EXAMPLES

A slurry of drilling cuttings from a Gulf of Mexico well drilled with oil-based drilling fluid was prepared containing 21.4 percent by weight solids in seawater. Blast furnace slag was added to samples of this slurry in concentrations of 125 and 250 pounds per barrel of slurry. The blast furnace slag was the product sold under the tradename "NEWCEM" by Blue Circle Atlantic, Inc. Five pounds per barrel of slurry each of sodium hydroxide and soda ash were also added to the slurry. After incubation at 150° F. for 48 hours, the samples had hardened and had axial compressive strengths of 623 and 1253 psi respectively. Samples which were left at room temperature for 167 hours had hardened and had axial compressive strengths of 410 and 1052 psi respectively.

Another sample of drilling cuttings, this sample from a well drilled in the Wasson Field of West Texas, was combined with 10 lb/gal salt-saturated drilling mud to form a slurry. Blast furnace slag in an amount of about 5 percent by weight based on the cuttings was added to the slurry. The blast furnace slag was "NEWCEM" brand blast furnace slag (a tradename of Blue Circle Atlantic, Inc.). The mixture was interlayered and not mechanically mixed to model the addition of blast furnace slag to a reserve pit as a drilling site. The slurry set to a solid within four weeks under ambient conditions.

A second sample of the slurry of Wasson Field drilling cuttings was combined with 20 percent by weight of "NEWCEM" brand blast furnace slag, based on the weight of the cuttings, and 10 percent by weight of sodium hydroxide, based on the weight of the "NEWCEM" brand blast furnace slag. The slurry hardened and after curing for about 12 days had an axial compressive strength of about 1400 psi.

Drilling fluids were decanted from the drilling cutting samples used in the foregoing examples, but the cuttings were not otherwise washed or cleaned. The drilling fluids were sufficiently compatible with the slag cement slurry that cleaning drilling fluid from the cuttings was not necessary.

These examples demonstrate that a strong cement can be prepared containing drilling cuttings from a slurry that is compatible with drilling fluids.

The foregoing description of the invention and examples of the invention are explanatory of the invention, and various changes in details of the described invention may be made within the scope of the following claims.

I claim:

1. A method for disposing of drilling cuttings comprising:
   decanting drilling fluids used during well drilling from cuttings attained during well drilling to concentrate said cuttings;
   then combining the cuttings with granulated water-quenched blast furnace slag to form a slurry;
   injecting the slurry into an annulus; and
   allowing the slurry to harden to form a solidified wellbore cement surrounding a well casing.

2. The method of claim 1 wherein said cuttings are ground to reduce the average particle size of said cuttings before the step of combining the cuttings with granulated water-quenched blast furnace slag.

3. The method of claim 1 wherein said separating step is conducted by gravity settlement.

4. The method of claim 1 wherein said separating step is conducted with a shaker table.

5. The method of claim 1 wherein a hardening activator is added to the slurry to accelerate the hardening of the slurry.

6. The method of claim 1 wherein the activator is selected from the group consisting of sodium hydroxide, calcium oxide, calcium hydroxide, magnesium hydroxide, magnesium oxide, sodium carbonate, sodium sulfate, calcium sulfate, calcium nitrate, calcium nitrite, zinc oxide, zinc carbonate, titanium carbonate, potassium hydroxide, potassium sulfate, potassium nitrate, potassium nitrite, copper sulfate, and sodium fluoride.

7. The method of claim 1 wherein at least a portion of the blast furnace slag and water had been previously circulated through a wellbore as drilling fluid.

8. The method of claim 1 wherein drilling cuttings comprise between about 14 percent and about 40 percent by weight of the slurry.

9. The method of claim 1 where in the slurry comprises between about 5 and about 40 percent by weight of blast furnace slag.

10. The method o claim 1 wherein the drilling cuttings are contaminated with between about one and about twenty percent by weight of drilling fluid.

11. The method of claim 1 wherein the drilling fluid is an oil-based drilling fluid.

12. The method of claim 1 wherein the wellbore has been drilled using a drilling slurry comprising blast furnace slag forming a blast furnace slag-containing fluid loss barrier on the outer wall of the borehole.

13. The method of claim 1 wherein the wellbore has been drilled using a drilling slurry comprising blast furnace slag forming a blast furnace slag-containing fluid loss barrier on the outer wall of the borehole.

14. The method of claim 1 wherein the water comprises a salt-containing brine.

15. The method of claim 1 wherein the water comprises sea water.

16. A method of disposing of drilling cuttings comprising:
   extracting cuttings attained during well drilling from drilling fluid used during well drilling;
   grinding said cuttings to reduce the average particle size of said cuttings;
   combining drilling fluid used during well drilling, ground cuttings, and granulated water-quenched blast furnace slag to form a cementitious slurry;
   injecting said cementitious slurry into an annulus;
   allowing the cementitious slurry to harden to form a solidified wellbore cement surrounding a well casing.

* * * * *